United States Patent
Beech et al.

(10) Patent No.: US 9,578,069 B1
(45) Date of Patent: Feb. 21, 2017

(54) COOPERATIVE IMS ACCESS FROM A VISITED DOMAIN

(71) Applicant: Sprint Communications Company L.P., Overland Park, KS (US)

(72) Inventors: Hal S. Beech, Olathe, KS (US); Pierce Andrew Gorman, Lee's Summit, MO (US); Sangeetha Balaganesh, Overland Park, KS (US); Whitney R. Cox, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 134 days.

(21) Appl. No.: 14/609,870

(22) Filed: Jan. 30, 2015

(51) Int. Cl.
*H04L 29/06* (2006.01)
*H04W 8/02* (2009.01)
*H04W 80/04* (2009.01)

(52) U.S. Cl.
CPC ....... *H04L 65/1069* (2013.01); *H04L 65/1006* (2013.01); *H04L 65/1016* (2013.01); *H04W 8/02* (2013.01); *H04W 80/04* (2013.01)

(58) Field of Classification Search
None
See application file for complete search history.

(56) References Cited

U.S. PATENT DOCUMENTS

| | | | |
|---|---|---|---|
| 6,728,239 B1 | 4/2004 | Kung et al. | |
| 7,957,326 B1 | 6/2011 | Christie, IV | |
| 8,175,011 B2 | 5/2012 | Christie, IV | |
| 8,593,995 B1 | 11/2013 | Christie, IV | |
| 2009/0156213 A1* | 6/2009 | Spinelli | H04W 36/36 455/436 |
| 2009/0296567 A1* | 12/2009 | Yasrebi | H04L 29/12028 370/221 |
| 2010/0048174 A1* | 2/2010 | Osborn | H04L 63/08 455/411 |
| 2011/0088086 A1* | 4/2011 | Swink | G06F 3/04883 726/7 |
| 2011/0213891 A1 | 9/2011 | Christie, IV | |
| 2012/0214480 A1* | 8/2012 | Ionescu | H04W 4/001 455/425 |
| 2014/0146714 A1 | 5/2014 | Christie, IV | |
| 2014/0259127 A1* | 9/2014 | Shaw | H04L 63/0884 726/5 |

* cited by examiner

*Primary Examiner* — Diane Lo

(57) ABSTRACT

Embodiments disclosed herein provide systems, methods, and computer readable media to provide roaming IP multimedia subsystem (IMS) access. In a particular embodiment, a method provides, in a communication interface, attaching a communication device to provide the communication device with access to a broadband access network associated with a visited domain of the communication device. The method further provides, in a proxy call session control element of a broadband services gateway (BSG), registering the communication device to access IMS services on behalf of an IMS core in the visited domain over the broadband access network, conveying Session Initiation Protocol (SIP) signaling between the communication device and the IMS core as a SIP proxy, and establishing a communication session between the communication device and the IMS core.

20 Claims, 5 Drawing Sheets

COOPERATIVE IMS ACCESS FROM A VISITED DOMAIN

TECHNICAL BACKGROUND

Many different services, from telephone, television, and Internet access, can now be provided by a broadband access connection. Each of these different services commonly operates independently, even if provided by the same entity, and are separated on the broadband access connection via independent virtual private networks (VPNs). Equipment at the customer premises functions as a broadband services gateway (BSG) to translate broadband communications for each service into communications that can be exchanged with service devices, such as a telephone device, television set, and personal computer.

Wireless devices, such as smartphones, are able to connect to a BSG in order to receive Internet access. However, in order to receive IP Multimedia Subsystem (IMS) services, such as voice, messaging, or other type of multimedia service, which are provided by a device's wireless network provider, the wireless device must communicate with the IMS from within the same network domain. Typically, this means the wireless device must communicate through the wireless network provider's network even though the BSG may be able to more effectively exchange communications for the IMS service.

Overview

Embodiments disclosed herein provide systems, methods, and computer readable media to provide roaming IP multimedia subsystem (IMS) access. In a particular embodiment, a method provides, in a communication interface, attaching a communication device to provide the communication device with access to a broadband access network associated with a visited domain of the communication device. The method further provides, in a proxy call session control element of a broadband services gateway (BSG), registering the communication device to access IMS services on behalf of an IMS core in the visited domain over the broadband access network, conveying Session Initiation Protocol (SIP) signaling between the communication device and the IMS core as a SIP proxy, and establishing a communication session between the communication device and the IMS core.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
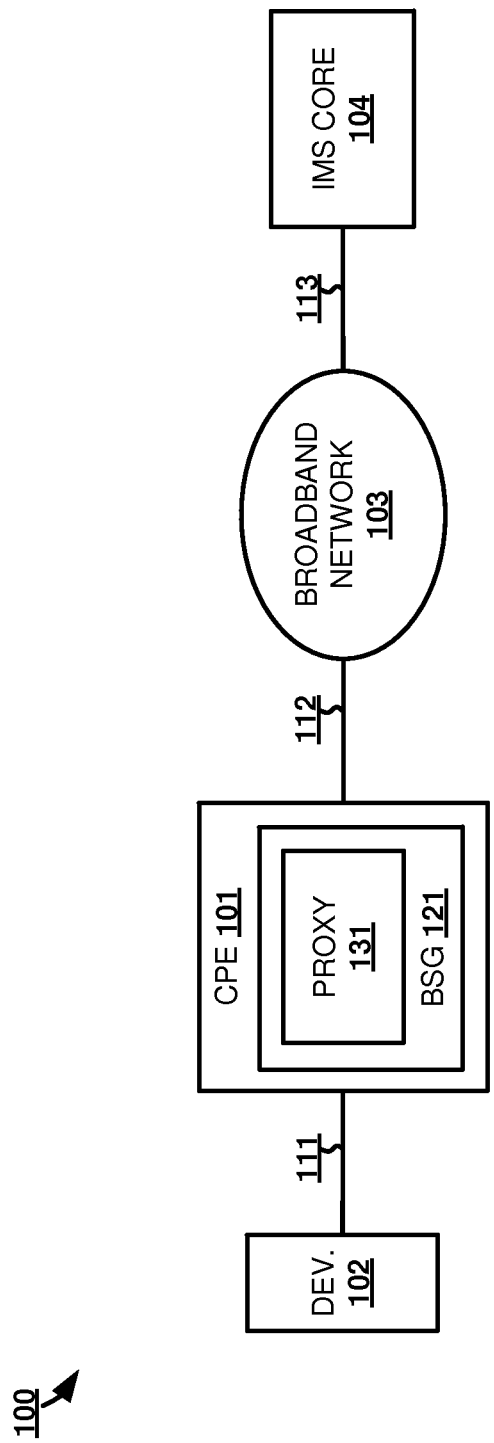
FIG. 1 illustrates a communication system to provide cooperative IMS access from a visited domain.

FIG. 1 illustrates communication system 100. Communication system 100 includes customer premises equipment (CPE) 101, communication device 102, broadband access network 103, and IP Multimedia Subsystem (IMS) core 104. CPE 101 includes a broadband services gateway (BSG) 121, which includes proxy call session control element 121. CPE 101 and communication device 102 communicate over communication link 111. CPE 101 and broadband access network 103 communicate over communication link 112. Broadband access network 103 and IMS core 104 communicate over communication link 113.

As its name implies, CPE 101 is located at a customer premises. The customer may be an individual, a business, or any other type of entity that may use broadband access network 103. CPE 101 provides the broadband access to systems and devices connected to CPE 101 at the customer premise. Broadband access network 103 may use any type of communication link to provide broadband access to CPE 101. Some common examples include, but are not limited to, a Digital Subscriber Line (DSL), coax cable, fiber optic to the premises, satellite, long range wireless, or any other type of link—including combinations thereof.

Broadband access network 103 further provides CPE 101 with access to IMS core 104. IMS core 104 is a system that provides one or more multimedia services through broadband network 103. These multimedia services may include voice calling, video calling, text messaging, multimedia messaging, streaming media, or any other type of multimedia service that can be provided over a broadband access network—including combinations thereof. Accordingly, devices connected to CPE 101 at the customer premises and having the proper permissions, such as a required service plan, can access the services provided by IMS core 104 through CPE 101.

However, in this example, communication device 102 is associated with services provided by an IMS core outside of the network domain of IMS core 104. For example, communication device 102 may be a wireless device from a particular cellular communication service provider. That provider may operate its own IMS core in a home domain for device 102 that is accessible through the provider's cellular network. While broadband access network 103 can allow device 102 to communicate with the network domain of IMS core 104, broadband access network 103 is typically unable to provide access to services provided in device 102's home domain. Of course, it should be understood that device 102 need not be wireless and IMS core 104 may be considered a visited domain for other reasons.

Figure 2:
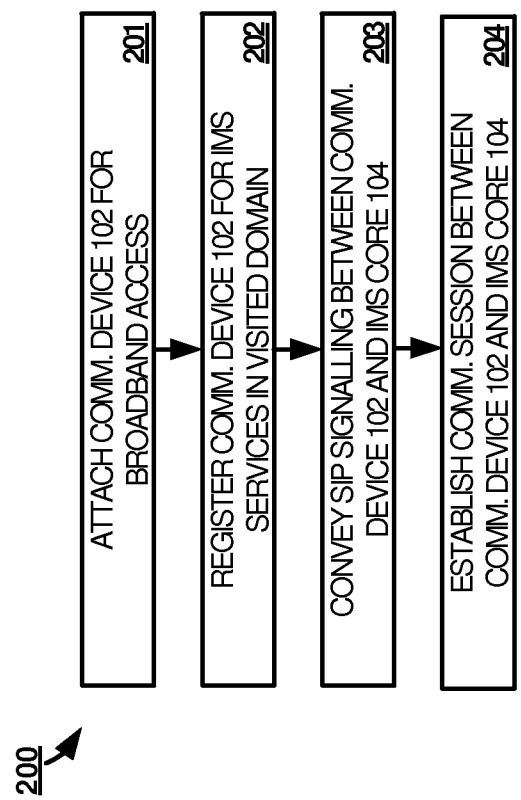
FIG. 2 illustrates an operation of the communication system in a scenario for providing cooperative IMS access from a visited domain.

FIG. 2 illustrates operation 200 of communication system 100 in a scenario for providing cooperative IMS access from a visited domain. Operation 200 provides, in a communication interface of CPE 101, attaching communication device 102 to provide communication device 102 with access to broadband access network 103 associated with a visited domain of communication device 102 (step 201). CPE 101 may attach communication device 102 using any type of wireless or wired local area networking interface, such as Wi-Fi or Ethernet. The process of attaching device 102 may include any necessary steps for configuring a connection with device 102 over which CPE 101 can provide access to broadband access network 103. In one example, communication device 102 is authenticated and registered for Wi-Fi access (e.g. using an SSID and password) and assigned a network address by CPE 101.

In proxy call session control element 131, operation 200 registers communication device 102 to access IMS services on behalf of IMS core 104 in the visited domain over the broadband access network (step 202). The functions described for proxy element 131 require cooperation between the visited domain and the home domain of communication device 102. For example, an operating entity of the visited domain may have entered into a roaming agreement with an operating entity of the home domain whereby the visited domain allows communication device 102 to access IMS services of the home domain. The operating entity of the visited domain would therefore configure at least IMS core 104 and proxy 131 to allow communication device 102 with roaming IMS service access.

The registration of communication device 102 may include authentication of communication device 102 for access to visited IMS services from IMS 104. The authentication may be performed using an authentication procedure typically performed by an IMS core. Proxy element 131 may communicate with IMS core 104 to retrieve information, such as credentials, necessary to authenticate communication device 102. Communication device 102 may be configured to search for and request registration for IMS services through any network to which device 102 is connected or may be specifically configured to identify proxy element 131 to register for IMS services when not connected to the home domain.

Once communication device 102 is registered, proxy 131 conveys Session Initiation Protocol (SIP) signaling between communication device 102 and IMS core 104 as a SIP proxy (step 203). Thus, communication device 102 is able to exchange SIP signaling with proxy 131 as though it is exchanging the SIP messages with IMS core 104. In some examples, a Gm signaling interface spans the links and broadband access network 103 between CPE 101 and IMS core 104. In order to secure the SIP signaling that is exchanged over the Gm interface, proxy 131 establishes security features, such as encryption, on the Gm interface. Furthermore, proxy 131 may determine whether device 102

A communication session can then be established using the conveyed SIP signaling by proxy call session control element 131 between communication device 102 and IMS core 104 (step 204). The communication session may comprise a communication session for IMS core 104 to provide a multimedia service that communication device 102 is authorized to receive from an IMS in device 102's home domain. In a basic example, a voice call is initiated to or from communication device 102 and the SIP signaling is used to establish that voice call via proxy 131. Also, depending on the configuration of IMS core 104, IMS core 104 may itself provide service to communication device 102 for the communication session or may establish a link to an IMS in device 102's home network so as the home IMS can provide the service via IMS 104.

Referring back to FIG. 1, communication device 102 comprises wired communication circuitry and/or wireless communication circuitry, such as Radio Frequency (RF) communication circuitry and an antenna. RF communication circuitry typically includes an amplifier, filter, modulator, and signal processing circuitry. Communication device 102 may also include a user interface, memory device, software, processing circuitry, or some other communication components. Communication device 102 may be a telephone, computer, e-book, mobile Internet appliance, wired or wireless network interface card, media player, game console, or some other communication apparatus—including combinations thereof.

Broadband access network 103 comprises network elements that provide communications services to devices through CPE 101. Broadband access network 103 may comprise switches, wireless access nodes, Internet routers, network gateways, application servers, computer systems, communication links, or some other type of communication equipment—including combinations thereof.

IMS core 104 comprises a computer system and communication interface. IMS core 104 may also include other components such as a router, server, data storage system, and power supply. IMS core 104 may reside in a single device or may be distributed across multiple devices. IMS core 104 is shown externally to broadband access network 103, but IMS core 104 could be integrated within the components of broadband access network 103.

Communication links 111-112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-113 could be direct links or may include intermediate networks, systems, or devices.

Figure 3:
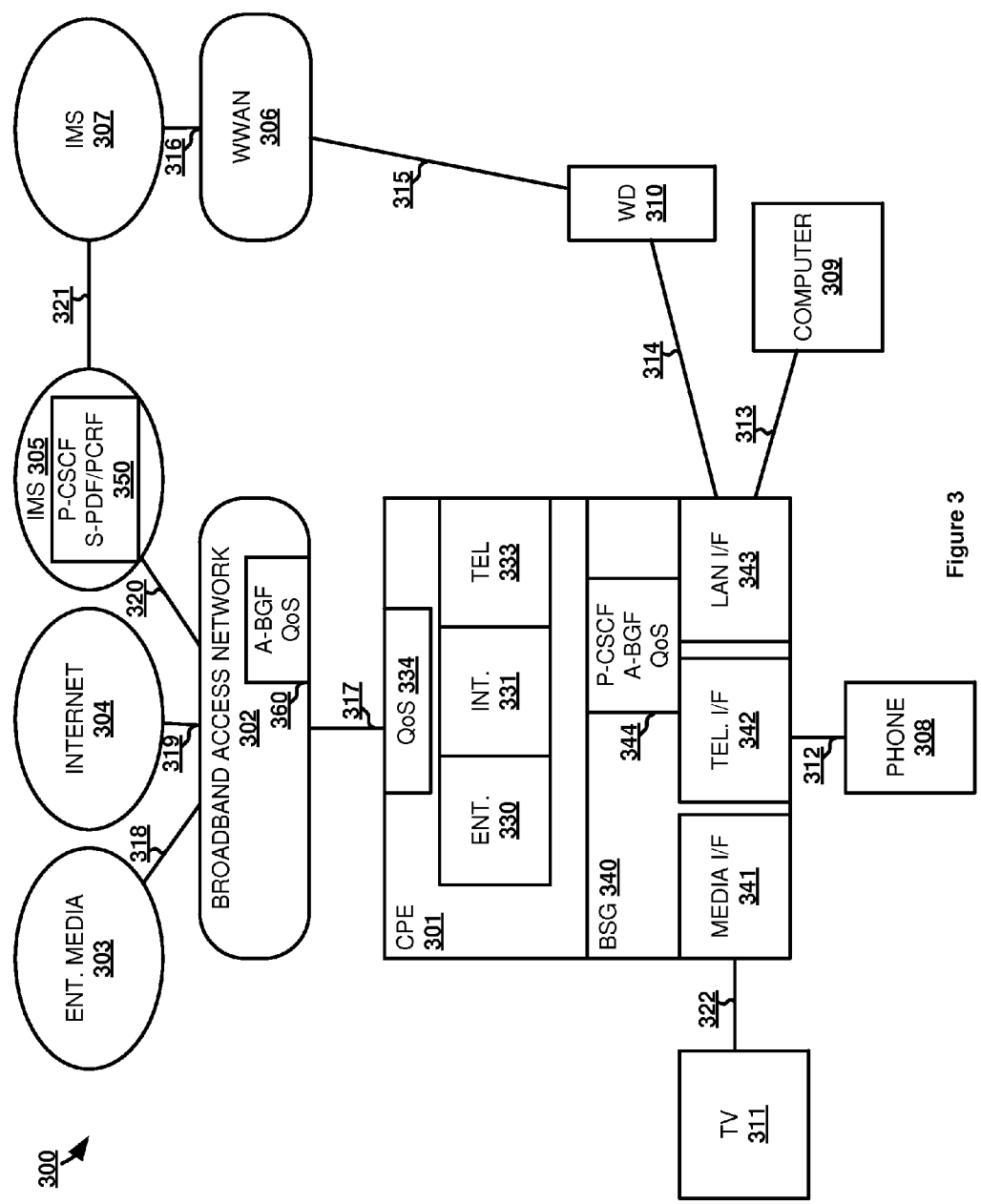
FIG. 3 illustrates a communication system to provide cooperative IMS access from a visited domain.

FIG. 3 illustrates communication system 300. Communication system 300 includes customer premises equipment 301, broadband access network 302, entertainment media service 303, Internet 304, IMS core 305, wireless wide area network (WWAN) 306, IMS core 307, phone 308, personal computer 309, wireless device 310, and TV 311. These elements communicate with one another over communication links 312-322 as shown.

In operation, wireless device 310 is associated with WWAN 306 and IMS 307. Specifically, IMS 307 is part of a home domain for wireless device 310 and accessible through WWAN 306. Wireless device 310 may be a device that receives communication services from WWAN 306 based on a service plan for wireless device 310 provided by the operating entity of WWAN 306. IMS 307 may also be under control of that same operating entity and, in some cases, may be considered part of WWAN 306. In a particular example, WWAN 306 may be a LTE wireless communication network and IMS 307 provides media services to wireless device 310 over the LTE network. These services may include voice or video call services, text or multimedia messaging services, media streaming, or any other type of data service that can be provided over a WWAN—including combinations thereof.

Similarly, CPE 301 is associated with broadband access network 302. CPE 301 allows a customer access to broadband services over broadband access network 302. For example, the customer may pay for services provided by an entity operating the broadband access network and places CPE 301 at their home or business to access the services. The operating entity may be the same as or different than the operating entity for WWAN 306. Broadband access network 302 not only provides devices connected to CPE 301 with access to Internet 304, network 302 provides access to entertainment and telephony services as part of a service package, which is commonly referred to as a triple play. The customer can then use a single connection, such as a cable, DSL, or fiber optic, connection to CPE 301 to carry all three services to their premises. In this example, entertainment media service 303 provides the television service component of the triple play, Internet 304 provides the Internet connection, and IMS core 305 provides telephony service component.

Entertainment media partition 330, Internet partition 331, and telephony partition 333 distinguish communications being received from each type of service through access network 302. While on the same connection, the communications for each of the three services may be separated into different address spaces (e.g. via Virtual Private Networks) or some other means of differentiating the communications may also be used. Broadband services gateway (BSG) 340 then translates the communications received through partitions 330-333 into signaling recognizable by devices connected to CPE 301. That is, the signaling is translated into signaling that would be used by each device if the device were connected through traditional means.

In particular, media interface 341 includes an interface for television 311 and comprises a connector for a television link standard, such as High-Definition Multimedia Interface (HDMI), Advanced Television System Committee (ATSC) signaling, or otherwise—including combinations thereof. Likewise, telephone interface 342 includes an interface to a traditional RJ11 telephone jack to emulate traditional circuit switched telephone signaling for standard telephones and may also include CAT-iq wireless interface for connecting wireless home phones, or some other type of telephone interface. Local Area Network (LAN) interface 343 provides an interface for connecting networked devices and may include a wireless access point for Wi-Fi, RJ-45 interface for Ethernet, or other networking interfaces. Therefore, the customer can watch TV 311, speak on phone 308, and access Internet 304 on computer 309 using BSG 340 of CPE 301.

Like computer 309, wireless device 310 is also able to connect to LAN interface 343 for access to Internet 304. Therefore, instead of using WWAN 306 for Internet access, wireless device 310 uses broadband access network 302 through CPE 301 instead. Access through CPE 301 may conserve battery life of wireless device 310, may conserve data allotment on a service plan for device 310, may compensate for a weak or non-existent wireless signal from WWAN 306, or for other reasons.

Traditionally, since IMS 307 is in a network domain associated with WWAN 306, when wireless device 310 is connected to CPE 301, wireless device 310 still uses WWAN 306 to access services provided by IMS 307. For example, if IMS 307 handles voice calling for wireless device 310, then calls to and from device 310 will be communicated through WWAN 306 rather than network 302 and CPE 301. However, as explained in more detail below, CPE 301 and IMS 305 associated with the domain of broadband access network 302, which is a visited domain for wireless device 310, are configured to provide the services of IMS 307 associated with the domain of WWAN 306, which is a home domain for wireless device 310.

Figure 4:
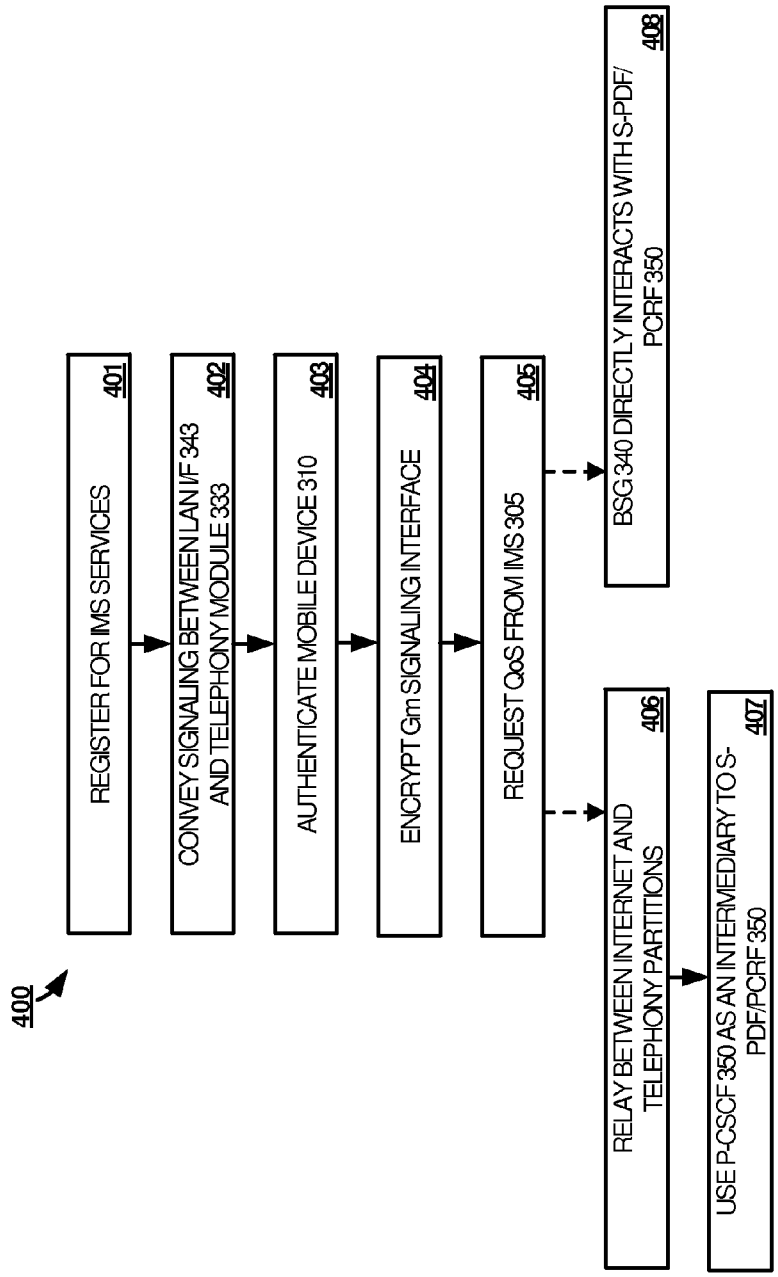
FIG. 4 illustrates an operation of the communication system in a scenario for providing cooperative IMS access from a visited domain.

FIG. 4 illustrates an operation 400 of communication system 300 in a scenario for providing cooperative IMS access from a visited domain. Specifically, BSG 340 includes element 344 having a proxy call session control function (P-CSCF), an access border gateway function (A-BGF), and a QoS controller. P-CSCF 344 registers wireless device 310 for IMS services when wireless device 310 attaches to Wi-Fi via LAN interface 343 (step 401). Once registered, P-CSCF conveys signaling for IMS services between the LAN interface 343 to which wireless device 310 is attached and telephony partition 333 (step 402). That is, typically signaling with wireless device 310 would be transferred through LAN interface 343 to Internet partition 331 to exchange communications with Internet 304. However, IMS signaling will be exchanged with IMS 305, which is the native IMS for telephony in the triple play service, using telephony partition 333 as directed by P-CSCF 344. Thus, wireless device 310 can exchange IMS signaling while only having to attach to LAN interface 343 in one context (i.e. only needs to provide a single Wi-Fi access context, SSID, and password, if necessary).

Once the above steps are complete, P-CSCF 344 is able to act as a first-hop SIP proxy between device 310 and IMS 305. However, to increase the security of the SIP proxy, P-CSCF 344 authenticates mobile device 310 for using IMS services (step 403). Authentication of mobile device 310 is performed in the same way mobile device 310 would be authenticated for services of IMS 307 through WWAN 306. Furthermore, P-CSCF 344 establishes encryption on the Gm signaling interface used to transport the SIP signaling (step 404).

Additionally, using an embedded Application Function (AF), P-CSCF 344 evaluates the media requirements in session signaling and requests QoS treatment in the access network via S-PDF/PCRF (Serving Policy Decision Function/Policy & Charging Rules Function) 350 in IMS core 305 (step 405). QoS element 334 may be invoked by P-CSCF 344 to manage QoS requirements for the connection between CPE 301 and access network 302.

Additionally, A-BGF 344 corresponds to the "media relay" component of a SIP-aware firewall or SBC. A-BGF 344 performs application-layer forwarding of IP packets, typically performing IP address translation between different mutually-isolated or incompatible IP address spaces.

At this point, P-CSCF 344 may perform in one of two distinct ways. Specifically, there are alternatives for the AF to access QoS control in the network. In one of the alternatives, BSG 340 may implement an AF for the local context, extracting media information to configure A-BGF 344 for media relay between Internet partition 331 and Telephony partition 333 (step 406). A network-based, tandem, aggregation, SIP proxy P-CSCF 350 may implement the AF for broadband access network 302 context and interact with core S-PDF/PCRF 350 (step 407). Thus, P-CSCF 350 works as an intermediary between P-CSCF 344 and S-PDF/PCRF 350.

In the other alternative, BSG 340 may fully implement the AF and directly interact with core S-PDF/PCRF 350 to provide IMS services without using P-CSCF 350 as an intermediary (step 408). It may also support configuration of A-BGF 344 to act as a media relay as described above.

Either of the two alternatives for implementing the AF may also control distribution network interface media QoS 344 as another aspect of the A-BGF configuration. Alternatively, dynamic QoS signaling for the user network interface may activate a BSG process that functionally replicates the broadband network interface dynamic QoS on the distribution user network interface.

Advantageously, operation 400 allows wireless device 310 to access IMS services through CPE 301. P-CSCF 344 handles the registration and exchange of SIP signaling to set up a media communication with visited IMS 305. Once P-CSCF 344 has set up a media communication, A-BGF 344 facilitates the exchange of that communication media. IMS 305 may itself provide the IMS service to wireless device 310 or may simply act as an intermediate IMS system for home domain IMS 307 to provide the service. Moreover, this arrangement allows for network level QoS and security to be implemented for roaming IMS sessions, which would not otherwise be provided if the IMS services were implemented as an over the top service.

Moreover, in addition to providing IMS services to roaming device 310, CPE 301 may also allow interoperation of those services with other connected devices. For example, when wireless device 310 is registered with BSG 340, wireless device 310 may receive an incoming call over broadband access network 302. BSG 340 may retrieve caller ID information for the call via P-CSCF 344 and trigger media interface 341 to display the caller ID information for the incoming call on TV 311 (e.g. within a display window or graphic overlay). In further examples, BSG 340 may allow for the incoming call to be answered using phone 308, TV 311, or computer 309 depending on the voice communication capabilities of each device.

Figure 5:
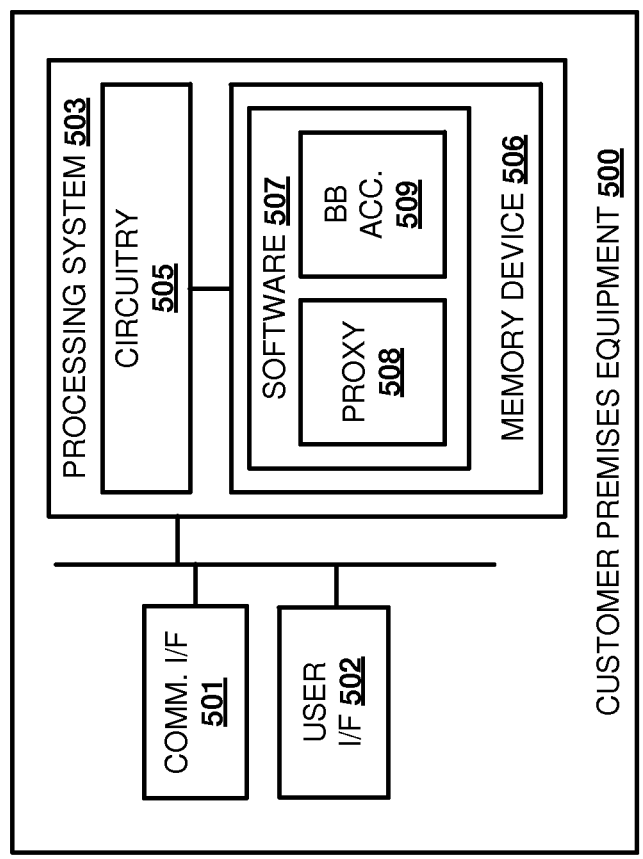
FIG. 5 illustrates customer premises equipment to provide cooperative IMS access from a visited domain.

FIG. 5 illustrates customer premises equipment 500. Customer premises equipment 500 is an example of customer premises equipment 101, although equipment 101 may use alternative configurations. Customer premises equipment 500 comprises communication interface 501, user interface 502, and processing system 503. Processing system 503 is linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, HDMI, or some other communication format—including combinations thereof.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other electronic circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes proxy call session control module 508 and broadband access module 509. Operating software 507 may further include an operating system, utilities, drivers, network interfaces, applications, or some other type of software. When executed by circuitry 505, operating software 507 directs processing system 503 to operate customer premises equipment 500 as described herein.

In particular, broadband access module 509 directs processing system 503 to attach a communication device via communication interface 501 to provide the communication device with access to a broadband access network associated with a visited domain of the communication device. Proxy call session control module 508 directs processing system 503 to register the communication device to access IMS services on behalf of an IMS core in the visited domain over the broadband access network and convey Session Initiation Protocol (SIP) signaling between the communication device and the IMS core as a SIP proxy. Control module 508 further directs processing system 503 to establish a communication session between the communication device and the IMS core.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating broadband access equipment to provide roaming IP multimedia subsystem (IMS) access, the method comprising:
    in a communication interface, attaching a communication device to provide the communication device with access to a broadband access network associated with a visited domain of the communication device;
    in a proxy call session control element of a broadband services gateway (BSG):
        registering the communication device to access IMS services on behalf of an IMS core in the visited domain over the broadband access network;
        conveying Session Initiation Protocol (SIP) signaling between the communication device and the IMS core as a SIP proxy; and
        establishing a communication session between the communication device and the IMS core.

2. The method of claim 1, wherein registering the communication device comprises:
    authenticating the communication device to access the IMS services; and
    establishing security features on a signaling interface between the communication device and the IMS core over which the SIP signaling is conveyed.

3. The method of claim 2, wherein establishing the security features comprises:
    determining a security level of the communication interface with the communication device;
    upon determining that the security level does not satisfy a threshold security level, implementing the security features for the communication interface.

4. The method of claim 1, wherein establishing the communication session comprises:
    implementing Quality of Service (QoS) requirements for the communication session between the communication device and the IMS core.

5. The method of claim 1, further comprising:
    in the proxy call session control element, configuring an Internet access element of the BSG to relay media for the communication session between the Internet access element and the proxy call session control element.

6. The method of claim 1, further comprising:
    in a proxy Border Gateway Function (BGF) of the BSG, conveying media for the communication session between the communication device and the IMS core as a media proxy.

7. The method of claim 1, wherein the communication session is further established from the IMS core to a second IMS core in a home domain of the communication device.

8. The method of claim 1, further comprising:
in the BSG, obtaining information related to the communication session via the proxy call session control element and sharing the information with one or more other devices attached to the BSG.

9. The method of claim 8, wherein the information includes caller ID information for the communication session and one of the other devices comprises a display, and the method further comprising:
in the BSG, triggering the display to open a viewing window that presents the caller ID information to a user.

10. The method of claim 1, wherein the communication interface includes a Wi-Fi interface and attaching the communication device comprises registering the communication device for Wi-Fi access.

11. A broadband access system to provide roaming IP multimedia subsystem (IMS) access, the system comprising:
a communication interface configured to attach a communication device to provide the communication device with access to a broadband access network associated with a visited domain of the communication device;
a proxy call session control element of a broadband services gateway (BSG) configured to register the communication device to access IMS services on behalf of an IMS core in the visited domain over the broadband access network, convey Session Initiation Protocol (SIP) signaling between the communication device and the IMS core as a SIP proxy, and establish a communication session between the communication device and the IMS core.

12. The broadband access system of claim 11, wherein the proxy call session control element configured to register the communication device comprises:
the call proxy session control element configured to authenticate the communication device to access the IMS services and establish security features on a signaling interface between the communication device and the IMS core over which the SIP signaling is conveyed.

13. The broadband access system of claim 12, wherein the proxy call session control element configured to establish the security features comprises:
the proxy call session control element configured to determine a security level of the communication interface with the communication device and, upon determining that the security level does not satisfy a threshold security level, implementing the security features for the communication interface.

14. The broadband access system of claim 11, wherein the proxy call session control element configured to establish the communication session comprises:
the proxy call session control element configured to implement Quality of Service (QoS) requirements for the communication session between the communication device and the IMS core.

15. The broadband access system of claim 11, further comprising:
the proxy call session control element configured to configure an Internet access element of the BSG to relay media for the communication session between the Internet access element and the proxy call session control element.

16. The broadband access system of claim 11, further comprising:
a proxy Border Gateway Function (BGF) of the BSG configured to convey media for the communication session between the communication device and the IMS core as a media proxy.

17. The broadband access system of claim 11, wherein the communication session is further established from the IMS core to a second IMS core in a home domain of the communication device.

18. The broadband access system of claim 11, further comprising:
the BSG configured to obtain information related to the communication session via the proxy call session control element and share the information with one or more other devices attached to the BSG.

19. The broadband access system of claim 18, wherein the information includes caller ID information for the communication session and one of the other devices comprises a display, and the BSG further configured to:
trigger the display to open a viewing window that presents the caller ID information to a user.

20. The broadband access system of claim 11, wherein the communication interface includes a Wi-Fi interface and wherein the communication interface configured to attach the communication device comprises:
the communication interface configured to register the communication device for Wi-Fi access.

* * * * *